United States Patent [19]
Whitman

[11] Patent Number: 5,141,631
[45] Date of Patent: Aug. 25, 1992

[54] POLYMER FILTER WITH BACKFLUSH PUMP

[75] Inventor: Timothy W. Whitman, South Hamilton, Mass.

[73] Assignee: John Brown Inc., West Warwick, R.I.

[21] Appl. No.: 712,244

[22] Filed: Jun. 7, 1991

[51] Int. Cl.$^5$ .............................................. B01D 33/44
[52] U.S. Cl. ......................................... 210/108; 210/107;
210/136; 210/138; 210/333.1; 210/391;
210/411; 210/412; 210/416.1; 210/489;
425/199
[58] Field of Search ................ 210/136, 416.1, 138,
210/391, 395, 411, 412, 489, 107, 108, 333.1,
334; 425/199

[56] References Cited

U.S. PATENT DOCUMENTS

| | | | |
|---|---|---|---|
| 1,585,817 | 5/1926 | Bailey et al. | 210/411 |
| 1,615,609 | 1/1927 | Bailey et al. | 210/411 |
| 2,183,577 | 12/1939 | McNeal | 210/411 |
| 2,183,578 | 12/1939 | McNeal | 210/411 |
| 2,184,177 | 12/1939 | Burrell | 210/411 |
| 2,310,587 | 2/1943 | MacNeill | 210/411 |
| 3,392,839 | 7/1968 | Mills | 210/295 |
| 3,425,557 | 2/1969 | Rosaen | 210/412 |
| 3,425,558 | 2/1969 | Rosaen | 210/108 |
| 3,493,113 | 2/1970 | Rosaen | 210/108 |
| 3,784,016 | 1/1974 | Akiyama | 210/412 |
| 3,817,377 | 6/1974 | Piggott | 210/409 |
| 4,055,500 | 10/1977 | Parker | 210/412 |
| 4,162,219 | 7/1979 | Miropolsky et al. | 210/108 |
| 4,486,304 | 12/1984 | Neuman et al. | 210/107 |
| 4,755,290 | 7/1988 | Neuman et al. | 210/138 |
| 4,844,789 | 7/1989 | Lundqvist | 210/411 |
| 4,849,113 | 7/1989 | Hills | 210/138 |
| 5,090,887 | 2/1992 | Gneuss | 210/108 |

Primary Examiner—Mary Lynn Theisen
Assistant Examiner—Sun Uk Kim
Attorney, Agent, or Firm—Lahive & Cockfield

[57] ABSTRACT

A filter for flowing polymer having a filter element progressively advanced between an on-stream position communicating between the upstream and downstream passages and a backflush position. In the latter position, filtered polymer is forced through a segment of the element in the direction opposite to on-stream flow. The filter is advanced in steps alternately with the energization of a pump for creating the backflush pressure. The steps are determined to cause each filter portion to remain in the backflush position for at least two consecutive steps.

8 Claims, 3 Drawing Sheets

POLYMER FILTER WITH BACKFLUSH PUMP

BRIEF SUMMARY OF THE INVENTION

This invention relates generally to the filtration of fluid polymers flowing toward product forming equipment such as molds and dies. More particularly, it concerns equipment adapted for the renewal of filter efficiency by the removal of impurities from the filter element.

A wide variety of filter changing devices has developed in the plastics industry to meet the need for removing lumps and other impurities from polymers before they reach extrusion dies or other product forming elements. The need for filtration has become particularly acute in the reprocessing of reclaimed plastics, although virgin plastic also presents problems with impurities in the form of agglomerations and lumps, largely due to the sensitivity of the plastic flow properties to changes in temperature. The progressive filling of areas of the filter element by these impurities substantially affects the rate of flow of polymer through the filter, with resulting effects upon the downstream pressure and the operation of product forming equipment.

Many existing so-called "screen changers" have no provision for removal of impurities from a filter element while it is on-stream. The element must be removed completely from the polymer flow passages so that it can be cleaned externally of the apparatus, with a new element being substituted in the on-stream position. Other devices are equipped with extended filter elements adapted for periodic advancement of portions thereof from positions external to the flow passages to and through an on-stream position. All of these devices employ mechanisms for the movement of filter elements into and out of the on-stream position through pressure seals having sufficient strength to withstand the elevated pressures that typically exist in polymer flow passages. In use, as the parts of these mechanisms move out of and return into the polymer stream they often carry degraded and oxidized polymer and air into the stream. This air and portions of such degraded and oxidized polymer are not subjected to filter action and flow downstream from the filter.

Accordingly, a principal object of this invention is to provide a filter that provides improved efficiency in the progressive clearing of impurities from a filter element, without removing it to an external, off-line position.

A second object is to provide apparatus for backflushing progressively changing portions of an on-line filter element with downstream polymer, that is, polymer that has already passed through the filter element, at pressures in excess of the downstream polymer pressure.

A third object is to provide means for preventing the loss of polymer other than backflushing polymer through portions of the apparatus.

With the foregoing and other objects hereinafter appearing in view, the features of this invention include a filter structure wherein a filter element is progressively advanced between an on-stream position communicating between the upstream and downstream passages and a backflush position. Backflushing is accomplished by alternately reducing the pressure in a downstream chamber to draw in a quantity of downstream polymer, and elevating the pressure in this chamber to force the polymer through the segment of the filter element in the backflush position and into an upstream chamber, the upstream chamber being in turn connected with an exhaust port.

Alternately with the lowering and raising of the downstream chamber pressure, the filter element is advanced in steps, each to move a new portion thereof from the on-stream position to the backflush position. The angle or rate of advancement is determined to cause each filter portion to remain in the backflush position for at least two consecutive steps, whereby the major flow of backflushing polymer occurs through the portion of the element that will be next to enter the on-stream position.

The foregoing and other features of the invention will become evident from the following description of a preferred embodiment.

DETAILED DESCRIPTION

Figure 1:
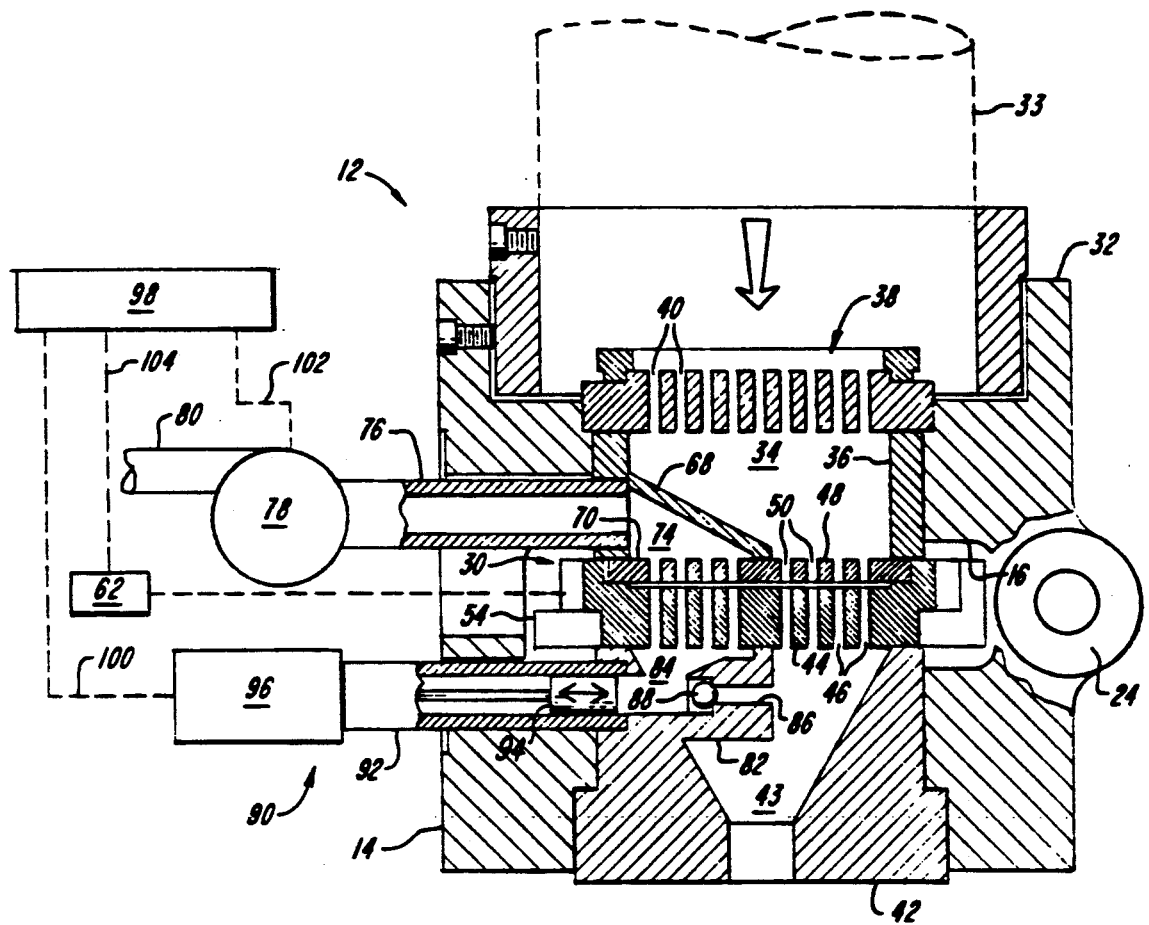
FIG. 1 is a plan view in section of the presently preferred embodiment of the invention.
Figure 2:
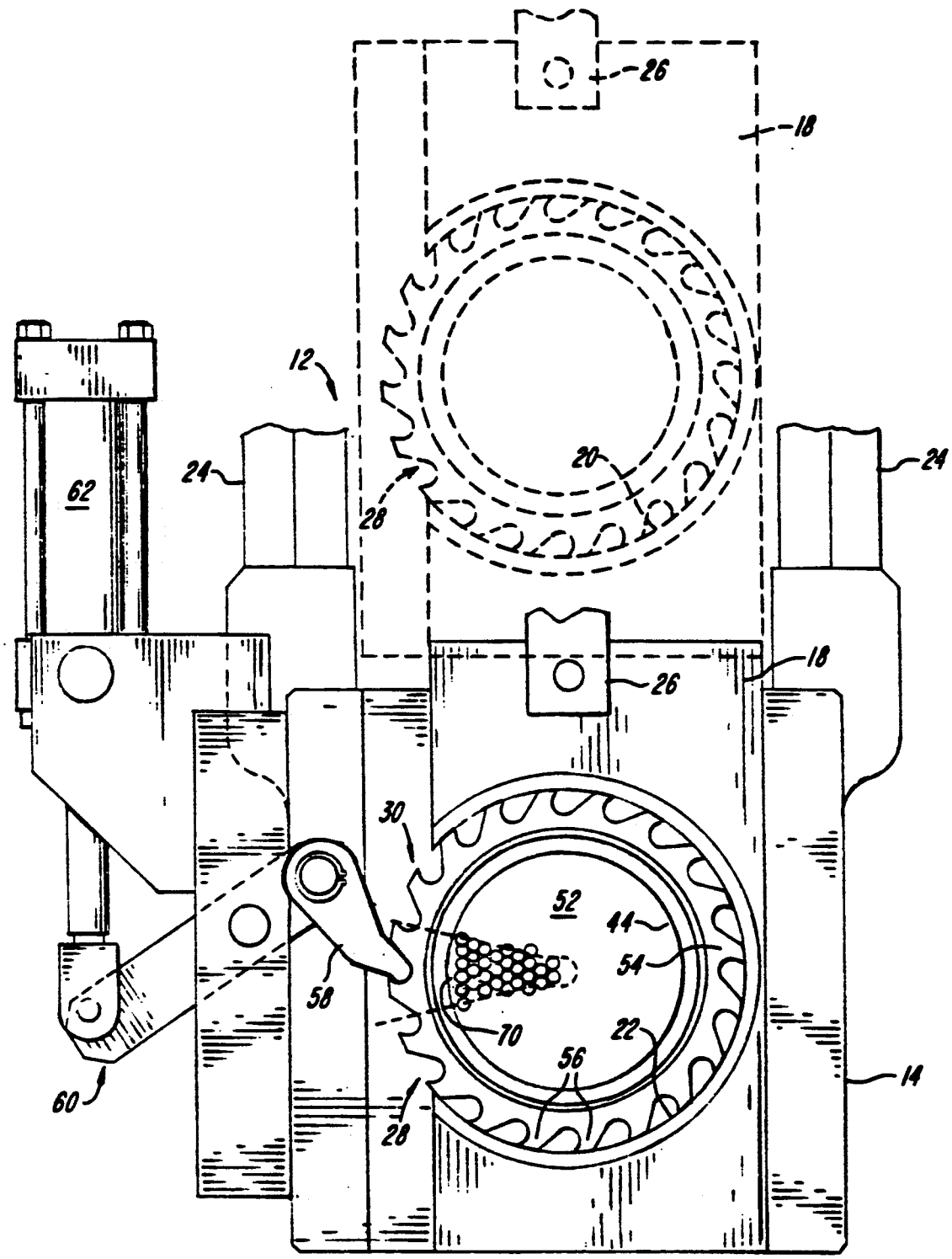
FIG. 2 is an elevation in section illustrating the filter advancing and changing means.

Referring to FIGS. 1 and 2, a filter for flowing polymer shown generally at 12 has a cube shaped body 14. A slide passage 16 extends through the body and receives a filter carrier plate 18 having a pair of apertures 20 and 22. Support rods 24 attached to the body extend to a hydraulic piston (not shown), the piston having a rod attached to a bracket 26 fixed to the plate 18. The piston is energized to reciprocate the plate 18 between two positions alternately locating the apertures 20 and 22 within and external to the body 14. The apertures are each adapted for rotatably receiving identical filter means 28 and 30. As shown, the filter means 30 is in the on-stream position and the filter means 28 is in position for removal from the aperture 20 for cleaning and replacement.

The body 14 has a flange 32 threaded to the end of an upstream polymer duct 33.

The body member 14 has a central bore defining an upstream passage 34. A partition member 36 fits within the bore and forms the walls of this passage. The member 36 has an annular surface to which the filter means 30 is slidingly fitted in sealing relationship. A coarse filter element 38 having a circular uniformly distributed array of holes 40 is fitted over the member 36 whereby a polymer flowing in the direction of the arrow passes through the holes 40 and large agglomerations of polymer or other impurities are prevented from reaching the upstream passage 34. Further details regarding the partition member 36 are given below.

A partition member 42 fits within the bore in the body member 14 and has an annular surface to which the filter means 30 is slidingly fitted in sealing relationship. The partition member 42 defines a downstream passage 43 which is connected by a suitable means (not illustrated) with dies or other polymer product forming apparatus.

The filter means 30 comprises a rigid support 44 having a circular array of uniformly distributed holes 46, and a rigid cover 48 having a circular array of uniformly distributed holes 50. Between the support 44 and cover 48 is located a circular fine meshed screen 52

Figure 3:
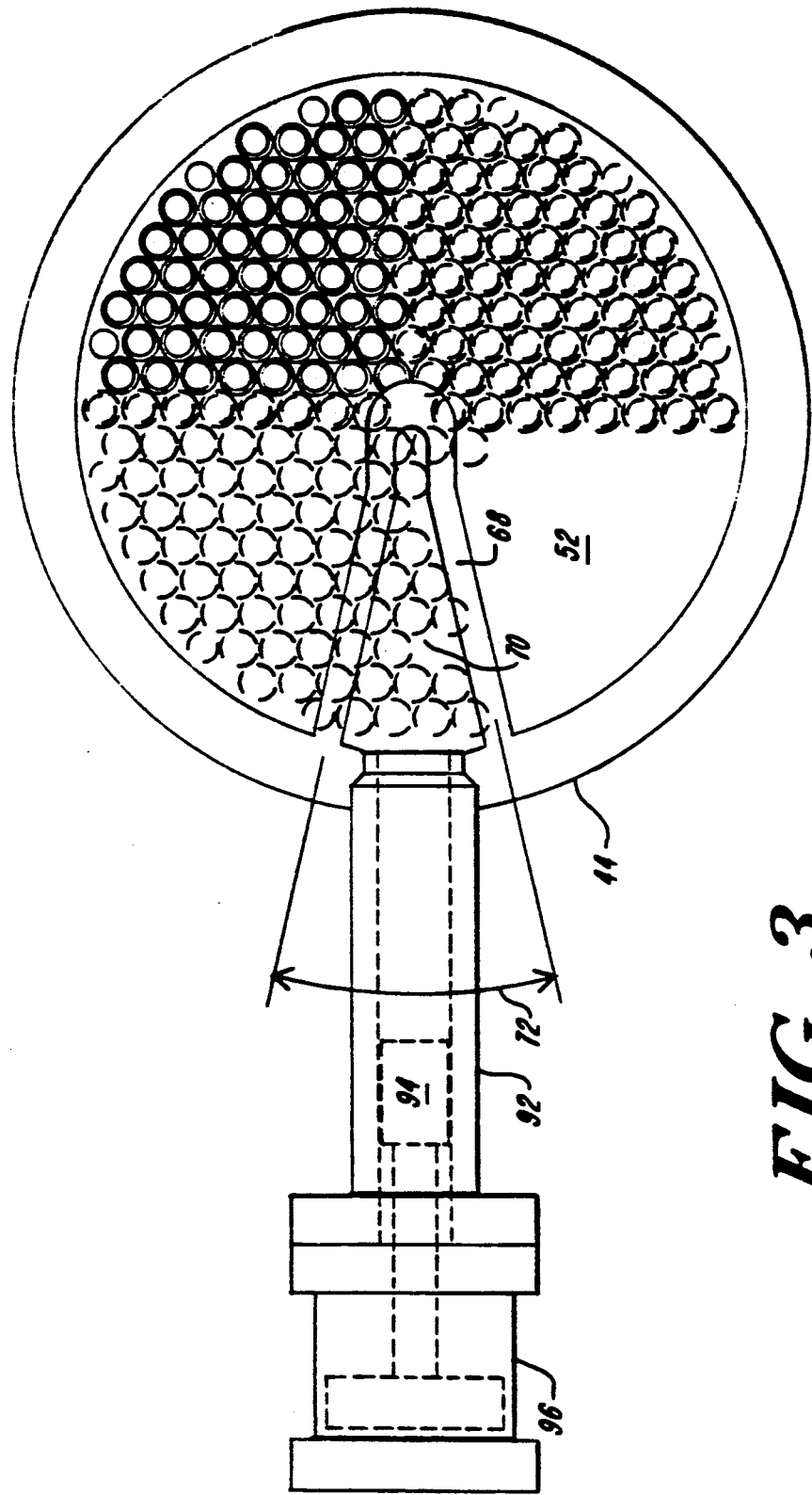
FIG. 3 is a detail view illustrating the pump associated with the downstream chamber.

(FIGS. 2 and 3). This screen is omitted from FIG. 1 for purposes of clarity.

In operation, the on-stream filter means 30 is intermittently and progressively rotated about its central axis in sealingly slidable relationship with the partition members 36 and 42. For this purpose, the support member 44 has an integral annular toothed portion 54 (FIGS. 1 and 2) which is provided, in this embodiment, with twenty teeth 56. A ratchet pawl 58 cooperates with the teeth 56 and is driven by a ratchet mechanism 60. The mechanism 60 is powered by a hydraulic piston 62 which, upon each actuation, advances the filter means 30 though an angle of 18°. The advancing mechanism 60 is supported on the body 14.

Details of the partition members 36 and 42 are as follows. An extension of the wall of the member 36 forms a wedge-shaped collection finger 68 that extends over a circular segment 70 of the filter means 30, this segment subtending an angle 72 (FIG. 3) of 36°. The segment 70 is thus substantially sealed by the collection finger 68 from the upstream passage 34, and an upstream chamber 74 defined by the collection finger communicates with the segment 70. A duct 76 is connected with a valve 78 which may be opened to permit the discharge of polymer from the chamber 74 through a discharge duct 80 to the space external to the apparatus.

In a similar manner, the partition member 42 is formed with a wall portion 82 extending over the same segment 70 of the filter means on the opposing side thereof, substantially sealing the segment from the downstream passage 43. The wall portion 82 defines a downstream chamber 84 and a passage 86 closed by a ballcheck valve 88 connecting the chamber 84 with the passage 43.

A piston pump 90 has a cylinder 92 supported in the body 14 and communicating with the downstream chamber 84. The pump has a reciprocating piston 94 driven by a hydraulic power source 96. The power source is intermittently operated to reduce the pressure in the chamber 84, thus drawing polymer from the passage 43 into the chamber, and then elevating the pressure in the chamber to force the polymer therefrom through the segment 70 of the filter means into the upstream chamber 74.

The operation of the apparatus is preferably controlled by timing means 98 connected with the valve 78, the ratchet piston 62 and the pump power source 96. These components are operated in the following sequence of steps.

The power source 96 is first actuated by a signal on a control line 100 to reduce the pressure in the downstream chamber 84 to draw polymer from the downstream passage 43 into the chamber. Next, the valve 78 is opened by a signal on a control line 102 to vent the upstream chamber 74 to the atmosphere. Next, the power source 96 is actuated to cause the pump 90 to elevate the pressure in the downstream chamber 84 forcing the polymer through the segment 70 into the upstream chamber 74 and thereby dislodging the collected particles and impurities from the portion of the filter screen 52 which is within the segment 70. The movement of the piston 94 thus produces a pressure impulse that forces a predetermined volume of polymer into the chamber 74, with an equal volume being displaced from that chamber into the duct 76. Next, the ratchet piston 62 is actuated by a signal on a line 104 to advance the filter means 22 by one tooth or 18°. Finally, the valve 78 is actuated to the closed position by a signal on the line 102. This completes the cycle for a single advancement of the filter means, and the cycles may be repeated at any chosen frequency dependent on the rate at which impurities must be removed from the screen 52 to maintain it in an efficient operative condition.

Since the angle subtended by the segment 70 in the backflush position defined by the collection finger 68 is 36° and the angular advancement of the filter means is 18° per cycle, each portion of the filter means will be located in the backflush position during two successive cycles. In each cycle, the polymer in the downstream chamber 84 is forced through an 18° portion of the filter means that was advanced into the backflush position two cycles earlier and also an 18° portion that was advanced into that position one cycle earlier. The former of these portions will have been subject to the preceding backflush cycle and will therefore be trapped by fewer impurities than the latter. Accordingly, a proportionately larger amount of the polymer will flow through the former segment. In this way the former segment, which will be next advanced from the backflush position into the on-line position, will have been subjected to two backflushing cycles, the latter of which is characterized not only by a relatively greater flow rate of polymer with optimal cleaning efficiency, but also by causing the holes in this segment to be filled with freshly filtered polymer immediately before it is rotated into the on-stream position.

It will be apparent that multiple step flushing of the filter means as described above may be accomplished by choosing variations of the angle 72 subtended by the collection finger 68 and the smaller angle of advancement of the filter means determined by the number of teeth 56 on the member 54.

The pressure forces generated by the power source 96 of the pump 90 may be of any magnitude necessary for efficient dislodgment of impurities from the filter means, and this magnitude is not dependent upon that of the pressure within the downstream passage 43.

In cases where a large amount of the impurities occur in the polymer being processed, the filter carrier plate 18 is shifted to locate the filter means 28 in the on-stream position and to locate the filter means 30 external to the body 14 where it is removed, cleaned and replaced in the aperture 22. The frequency of such replacement can be substantially reduced in most cases because of the cleaning action that is continually proceeding during the above-described cycles of advancement while each filter means remains in the on-stream position illustrated.

In the practice of this invention the filter means is preferably constructed as illustrated, with a uniformly foraminate circular active surface area, that is, without spaced partitions for sealing engagement with the wall portions 68 and 82 of the partition members 36 and 42. To prevent excessive seepage of upstream polymer between the mutually engaging surfaces of the collection finger 68 and filter means 22 the valve 78 is closed, as previously described, during a portion of each cycle. Thus, substantially all of the polymer that is discharged through the duct 80 is polymer that was forced through the filter means from the downstream chamber 84, with only a very small fraction comprising leakage polymer entering the upstream chamber 74 around the edges of the collection finger 68.

I claim:

1. A filter for flowing polymer comprising, in combination, filter means including an element having a foraminate filter area, a body defining upstream and downstream passages and supporting the filter means rotatably therein with said area of the filter element between said passages, said body having partition means defining a downstream chamber communicating with a segment of said area and an upstream chamber substantially sealed from the upstream passage and extending over and communicating with a portion of said area including said segment, a check valve connecting the downstream chamber with the downstream passage, a pump connected to the downstream chamber and having a power source reciprocating the pump to lower the downstream chamber pressure thereby drawing polymer thereinto through the check valve, and to raise said pressure thereby forcing the polymer through said segment into the upstream chamber, exhaust means connecting between the upstream chamber and the exterior of the body, and advancing means rotating said filter means to advance said segment out of communication with said chambers and to advance another segment of said area into communication with said chambers.

2. A filter according to claim 1, in which the pump is a piston pump.

3. A filter according to claim 1, in which the exhaust means includes a discharge valve and means to open the discharge valve while the pump is forcing polymer through said segment.

4. A filter according to claim 1, in which the filter means comprises a rigid plate provided with a uniformly distributed array of thru holes throughout said area, and a finely meshed screen covering said holes on the upstream side thereof and supported by the plate.

5. A filter according to claim 1, in which the advancing means includes a ratchet mechanism rotating said filter means intermittently by a predetermined angle in steps.

6. A filter according to claim 5, in which the advancing means operates alternately with the reciprocation of the pump, and said angle is determined to cause a portion of said area to remain in communication with said chambers for at least two successive steps.

7. A filter according to claim 5, in which the exhaust means includes a discharge valve, and including timing means operable upon said power source, discharge valve and advancing means in the following sequence: lower the downstream chamber pressure, open the discharge valve, raise the downstream chamber pressure, rotate said element a step, and close the discharge valve.

8. A filter according to claim 1, in which said segment and said portion of said area, respectively communicating with the downstream and upstream chambers, are coextensive.

* * * * *